H. J. PERKINS.
STEERING DEVICE FOR MOTOR BOATS.
APPLICATION FILED OCT. 5, 1908.
911,069.
Patented Feb. 2, 1909.
2 SHEETS—SHEET 1.
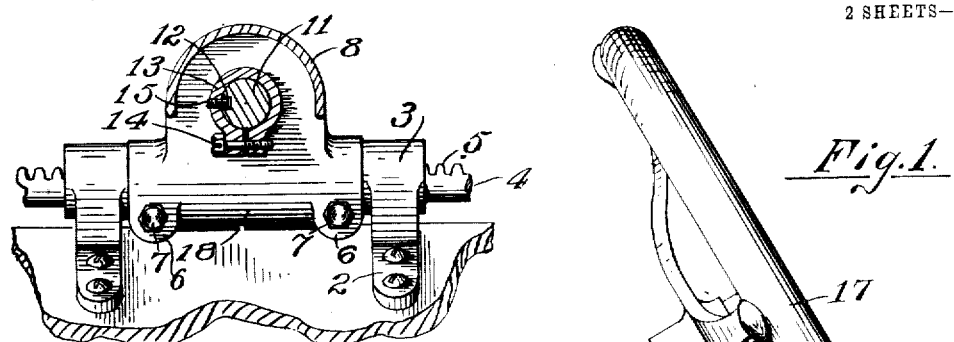
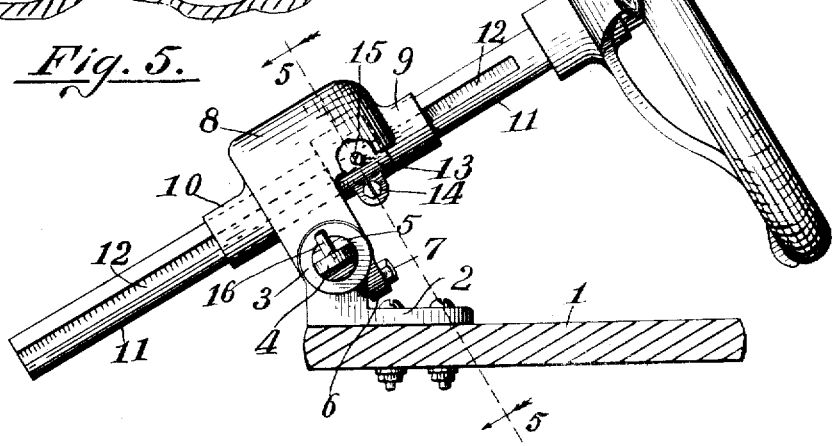
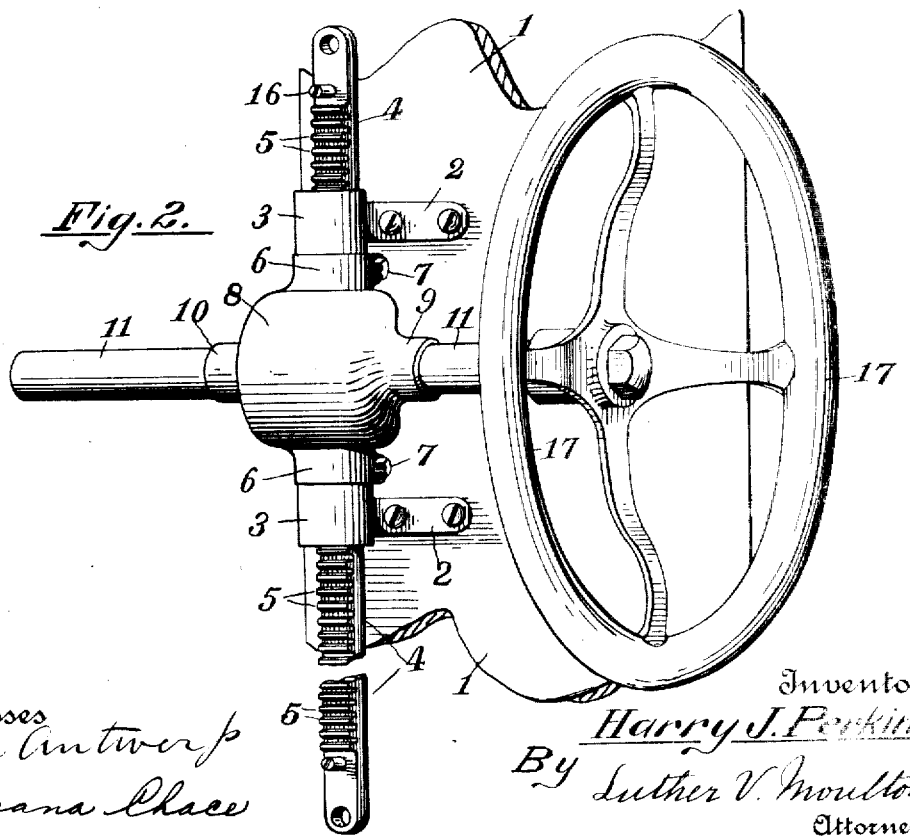
Witnesses
H. C. Van Antwerp
Georgiana Chace
Inventor
Harry J. Perkins
By Luther V. Moulton
Attorney

H. J. PERKINS.
STEERING DEVICE FOR MOTOR BOATS.
APPLICATION FILED OCT. 5, 1908.

911,069.

Patented Feb. 2, 1909.
2 SHEETS—SHEET 2.

Witnesses
H. O. Van Antwerp
Georgiana Chace

Inventor
Harry J. Perkins.
By Luther V. Moulton
Attorney

UNITED STATES PATENT OFFICE.

HARRY J. PERKINS, OF GRAND RAPIDS, MICHIGAN, ASSIGNOR TO MICHIGAN WHEEL COMPANY, OF GRAND RAPIDS, MICHIGAN, A CORPORATION OF MICHIGAN.

STEERING DEVICE FOR MOTOR-BOATS.

No. 911,069.

Specification of Letters Patent.

Patented Feb. 2, 1909.

Application filed October 5, 1908. Serial No. 456,274.

*To all whom it may concern:*

Be it known that I, HARRY J. PERKINS, a citizen of the United States of America, residing at Grand Rapids, in the county of Kent and State of Michigan, have invented certain new and useful Improvements in Steering Devices for Motor-Boats; and I do hereby declare the following to be a full, clear, and exact description of the invention, such as will enable others skilled in the art to which it appertains to make and use the same.

Figure 3:
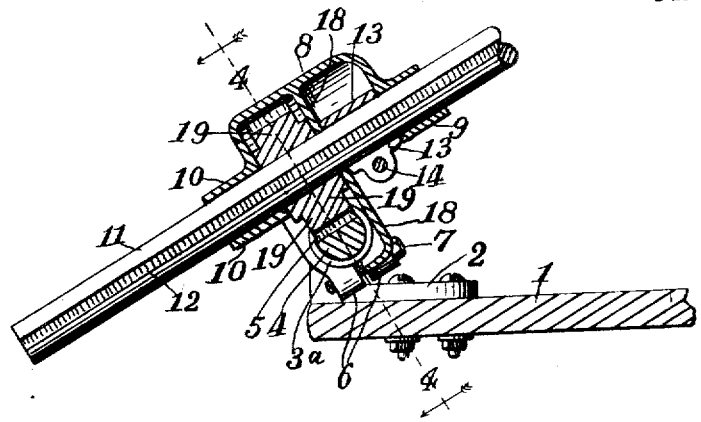
Figure 4:
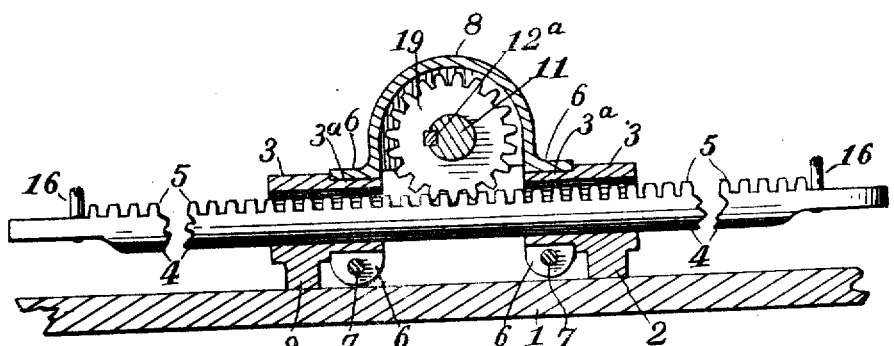
Figure 6:
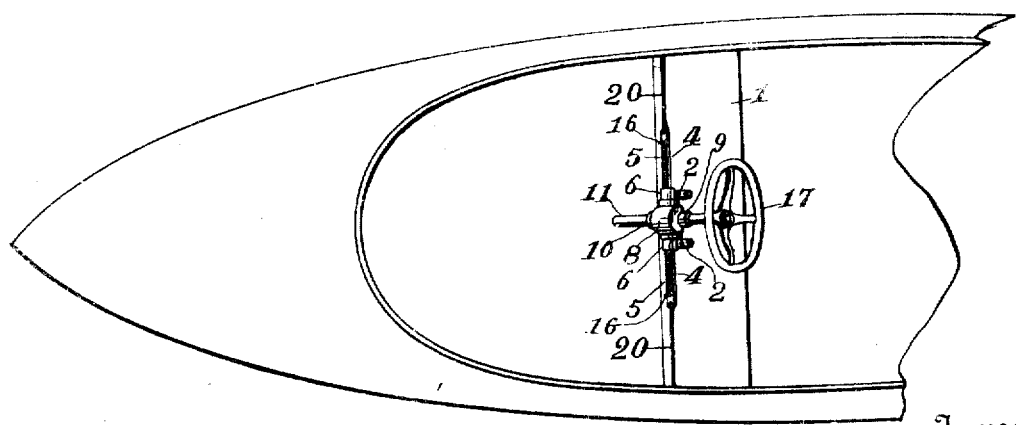

My invention relates to improvements in steering devices for motor boats and its object is to provide the same with means whereby the manually operated wheel may be adjusted in various planes relative to the horizontal and also vertically adjusted as occasion may require, and to provide the device with various new and useful features as hereinafter more fully described and particularly pointed out in the claims; reference being had to the accompanying drawings in which:

Figure 1 is a side elevation of a device embodying my invention; Fig. 2 a plan view of the same; Fig. 3 a horizontal sectional detail in a vertical plane; Fig. 4 a section at right angles to Fig. 3 on the line 4—4 of the same; Fig. 5 the same on the line 5—5 of Fig. 1; and, Fig. 6 a plan view on a reduced scale of the device attached to the thwart of a boat as applied for use.

Like numbers refer to like parts in all of the figures.

1 represents the thwart of a boat to which the device is attached.

2 are brackets secured to the thwart near one edge thereof and having upwardly projecting tubular heads 3 also laterally projecting toward each other as at 3ª to provide journal bearings for a hollow gear case 8 provided with divided clamps 6 journaled on the inwardly projecting members 3ª and provided with clamping bolts 7 whereby the case is adjustable about a horizontal axis. This gear case 8 is also provided with oppositely extending bearings 9 and 10 for the shaft 11 with the axis of the same at right angles to the axis of the bearings 3ª and in these bearings 9 and 10 is the shaft 11 both rotative and longitudinally adjustable therein. This shaft is provided with a key-way 12, and on the shaft to hold the same in longitudinal adjustment is a divided set collar 13 provided with a clamping bolt 14. This collar is located in one of two chambers in the case formed by a partition therein, and is provided with a pin 15 adjustable in the key-way 12 to prevent the collar from rotating on the shaft when turning the bolt 14. Between the partition 18 and the bearing 10 and in the other chamber of the case is inserted a pinion 19 in which the shaft 11 is slidable longitudinally. This pinion is provided with a sliding key 12ª adjustable in the key-way 12 whereby the shaft will rotate the pinion in the case and can be adjusted therein. Extending through the tubular heads of the brackets is a rack bar 4 rotative and slidable therein and provided with rack teeth 5 engaged by the pinion 19 to move said bar longitudinally by rotating the shaft 11 by means of a manually operated wheel 17 attached to the upper end thereof.

16 are pins in the respective ends of the rack bar to limit the longitudinal movement of the same in the heads 3.

In operation the shaft can be adjusted about the horizontal axis of the rack bar at any angle from horizontal to vertical and held adjusted by friction of the clamps 6 on the bearings 3ª of the brackets. The shaft can also be adjusted to vertically adjust the wheel higher or lower by loosening the collar 13, and sliding the shaft longitudinally in the collar, pinion and bearings of the case, and the shaft retained in such adjusted position by again tightening the collar by the screw 14.

What I claim is:—

1. A steering device, comprising a manually operated shaft, means for adjusting the shaft about a horizontal axis, means for also adjusting the shaft longitudinally, a pinion on the shaft in which the same is longitudinally adjustable only, and a rack bar engaged and moved by the pinion.

2. A steering device, comprising a case adjustable about a horizontal axis, a shaft provided with a hand wheel and both rotative and longitudinally adjustable in the case, a pinion and set collar in which the shaft is longitudinally movable and a rack bar in the horizontal axis of the case and engaged by the pinion.

3. A steering device, comprising a case divided into two compartments and adjustable about a horizontal axis, a shaft both rotative and longitudinally adjustable in the case, a pinion and a set collar in the respective compartments of the case and in which the shaft is longitudinally adjustable only, and a rack bar longitudinally movable in the horizontal axis of the case and engaged by the pinion.

4. A steering device, comprising brackets having laterally projecting tubular heads, a case having integral clamps mounted on the projecting portions of the bracket heads and adjustable about the axis thereof, a rack bar longitudinally and rotatively movable in the heads, bearings at the opposite sides of the case, a shaft rotative and longitudinally adjustable in the bearings and having a key-way, a set collar and a pinion in the case and in which the shaft is longitudinally adjustable, said pinion also engaging the rack bar, a key in the pinion and slidable in the key-way, and a manually operated wheel on the shaft.

5. A steering device, consisting of brackets having laterally projecting tubular heads, a case having integral and divided clamping members mounted on the projecting parts of the heads and adjustable about the axis thereof, a partition in the head, bearings at opposite sides of the head, a shaft rotative and slidable in the bearings, and also having a key-way, a divided collar on the shaft and having a clamping screw, a pin in the collar and adjustable in the key-way, a pinion on the shaft, a key in the pinion and slidable in the key-way of the shaft, a manually operated wheel on the shaft, and a rack bar rotative and slidable in the heads and engaged by the pinion.

In testimony whereof I affix my signature in presence of two witnesses.

HARRY J. PERKINS.

Witnesses:
PALMER A. JONES,
LUTHER V. MOULTON.